United States Patent [19]
Oda

[11] Patent Number: 5,086,383
[45] Date of Patent: Feb. 4, 1992

[54] STEP-UP POWER SUPPLYING CIRCUIT
[75] Inventor: Seiji Oda, Toyama, Japan
[73] Assignee: Elco Co., Ltd., Toyama, Japan
[21] Appl. No.: 693,594
[22] Filed: Apr. 30, 1991
[51] Int. Cl.$^5$ .................................... H02M 1/12
[52] U.S. Cl. ............................ 363/44; 323/223; 363/84; 363/124; 363/126
[58] Field of Search ........... 323/222, 223, 282, 351; 363/44, 84, 86, 89, 90, 124, 126

[56] References Cited

U.S. PATENT DOCUMENTS

| | | | |
|---|---|---|---|
| 4,034,281 | 7/1977 | Morita et al. | 363/124 |
| 4,045,708 | 8/1977 | Neal | 363/126 |
| 4,546,304 | 10/1985 | Schwarz | 323/222 |
| 4,591,966 | 5/1986 | Smith | 363/90 |
| 4,803,378 | 2/1989 | Richardson | 323/282 |
| 4,837,495 | 6/1989 | Zansky | 323/222 |

Primary Examiner—Jeffrey Sterrett
Attorney, Agent, or Firm—Wenderoth, Lind & Ponack

[57] ABSTRACT

After an AC voltage was rectified and smoothed, it is stepped up by a chopper circuit. Another winding is magnetically coupled to a choke coil of the chopper circuit so as to have the same polarity. An inductance for adjusting a current is connected serially with another winding. A current of a phase opposite to a phase of a current flowing in the choke coil is generated in another winding, thereby setting off a ripple current flowing in an input smoothing capacitor.

5 Claims, 4 Drawing Sheets

STEP-UP POWER SUPPLYING CIRCUIT

BACKGROUND OF THE INVENTION

The present invention relates to a step-up power supplying circuit for stepping-up a DC voltage which is obtained by rectifying and smoothing an AC voltage and for supplying the step-up DC voltage to a load and, more particularly, to a step-up power supplying circuit for stepping-up a DC voltage by using a chopper circuit and for supplying the step-up DC voltage to a load.

As a conventional step-up power supplying apparatus using a chopper circuit, for instance, there is an apparatus as shown in FIG. 1.

In FIG. 1, reference numeral 10 denotes a commercially available AC power source; 12 and 14 input terminals to which a commercially available AC voltage is supplied from the commercially available AC power source 10; 16 a rectifying circuit which constructs a diode bridge by four diodes $D_1$, $D_2$, $D_3$, and $D_4$ and rectifies the AC input voltage; and 20 a capacitor for smoothing the voltage which has been rectified by the rectifying circuit 16. The rectifying circuit 16 and the capacitor 4 construct a rectifying and smoothing circuit 18 for converting the AC voltage into the DC voltage.

A chopper circuit 36 is subsequently provided. The chopper circuit 36 has a choke coil 22 and a transistor 24 serving as a switching device. The transistor 24 is turned on/off by a switching operation by high frequency pulses which are generated from an oscillator 26, thereby intermittently inducing an energy in the choke coil 22.

Reference numeral 28 denotes a diode for rectifying and 30 indicates a capacitor for smoothing. The intermittent energy induced in the choke coil 22 is rectified by the diode 28 and is smoothed by the capacitor 30 and is supplied to a load 34 through an output terminal 32.

When the commercially available AC voltage is supplied from the AC power source 10 to the input terminals 12 and 14, the commercially available AC voltage is rectified by the rectifying circuit 16 and is smoothed by the capacitor 20 and is supplied as a DC voltage to the chopper circuit 36.

The intermittent energy is induced in the choke coil 22 by the high frequency switching operation of the transistor 24 by the oscillator 26 in the chopper circuit 36. The intermittent energy induced in the choke coil 22 is rectified by the diode 28 and is smoothed by the capacitor 30 and is supplied to the load 34 through the output terminal 32 as a DC voltage which has been stepped up to a voltage level higher than the level of the input voltage from the rectifying and smoothing circuit 18 and has been regulated.

However, in such a conventional step-up power supplying circuit, there is a problem such that when the transistor 24 performs the switching operation, a high frequency ripple current flows from the choke coil 22 to the capacitor 20 to smooth the input voltage and a high frequency ripple voltage is developed in the capacitor 20, so that a high frequency noise is multiplexed between the input terminals 12 and 14.

SUMMARY OF THE INVENTION

It is an object of the invention to provide a step-up power supplying circuit which reduces an amount of high frequency noise which is multiplexed to input terminals.

Another object of the invention is to provide a step-up power supplying circuit which sets off a high frequency ripple voltage which is generated in a smoothing capacitor for supplying a DC voltage to a chopper circuit.

Still another object of the invention is to provide a step-up power supplying circuit in which a current of a phase opposite to that of a current change of a choke coil is produced by an induced voltage into another winding which is magnetically coupled to the choke coil provided in a chopper circuit, thereby setting off a high frequency ripple voltage which is generated in a capacitor for smoothing an input voltage.

Further another object of the invention is to provide a step-up power supplying circuit in which a current of a phase opposite to that of a current change of a choke coil is produced by an induced voltage in another winding which is magnetically coupled to the choke coil provided in a chopper circuit and is supplied to another capacitor which is serially connected to a capacitor for smoothing an input voltage, thereby setting off a high frequency ripple voltage which is generated in the capacitor for smoothing the input voltage.

That is, according to a step-up power supplying circuit of the invention, a step-up chopper circuit is provided subsequent to a rectifying and smoothing circuit for rectifying and smoothing an AC voltage. The chopper circuit comprises: a transistor which is switched by an oscillator; a choke coil for producing an intermittent energy by the on/off operations of the transistor; and a rectifying diode and a smoothing capacitor for rectifying and smoothing the intermittent energy of the choke coil and for generating a step-up DC voltage.

Another winding is magnetically coupled with the choke coil of the chopper circuit so as to have the same polarity. One end of the winding is connected to the ground and the other end is connected to the input side of the choke coil. Further, an inductance for adjusting a current is connected serially with the winding.

The step-up power supplying circuit operates in a manner such that when the transistor is on, a current flowing in the choke coil linearly increases, while a current flowing in another winding linearly decreases. On the contrary, when the transistor is off, the current flowing in the choke coil linearly decreases, while the current flowing in another winding linearly increases.

As mentioned above, a current of a phase opposite to that of the current flowing in the choke coil is generated in another winding, thereby setting off the ripple current flowing in the input smoothing capacitor.

Thus, the generation of the high frequency ripple voltage of the input smoothing capacitor can be prevented and an amount of high frequency noise which is multiplexed between the input terminals can be reduced.

The above and other objects, features, and advantages of the present invention will become more apparent from the following detailed description with reference to the drawings.

DETAILED DESCRIPTION OF THE PREFERRED EMBODIMENTS

Figure 1:
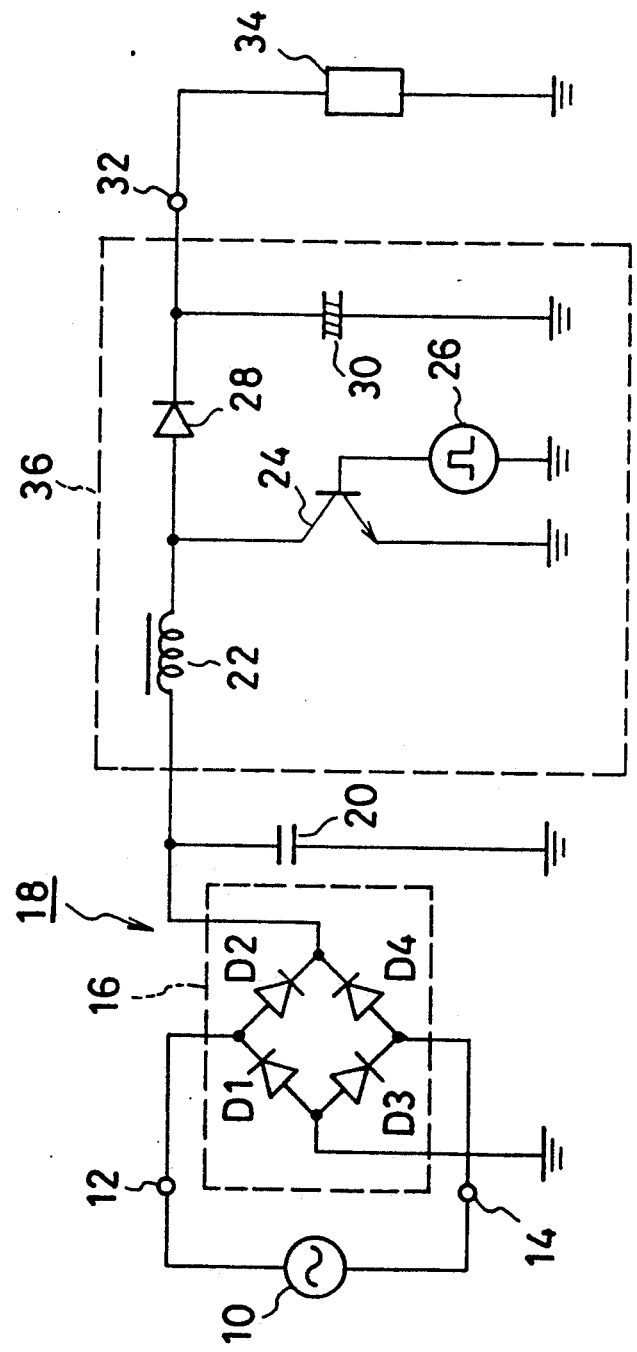
FIG. 1 is a circuit diagram showing a conventional example.
Figure 2:
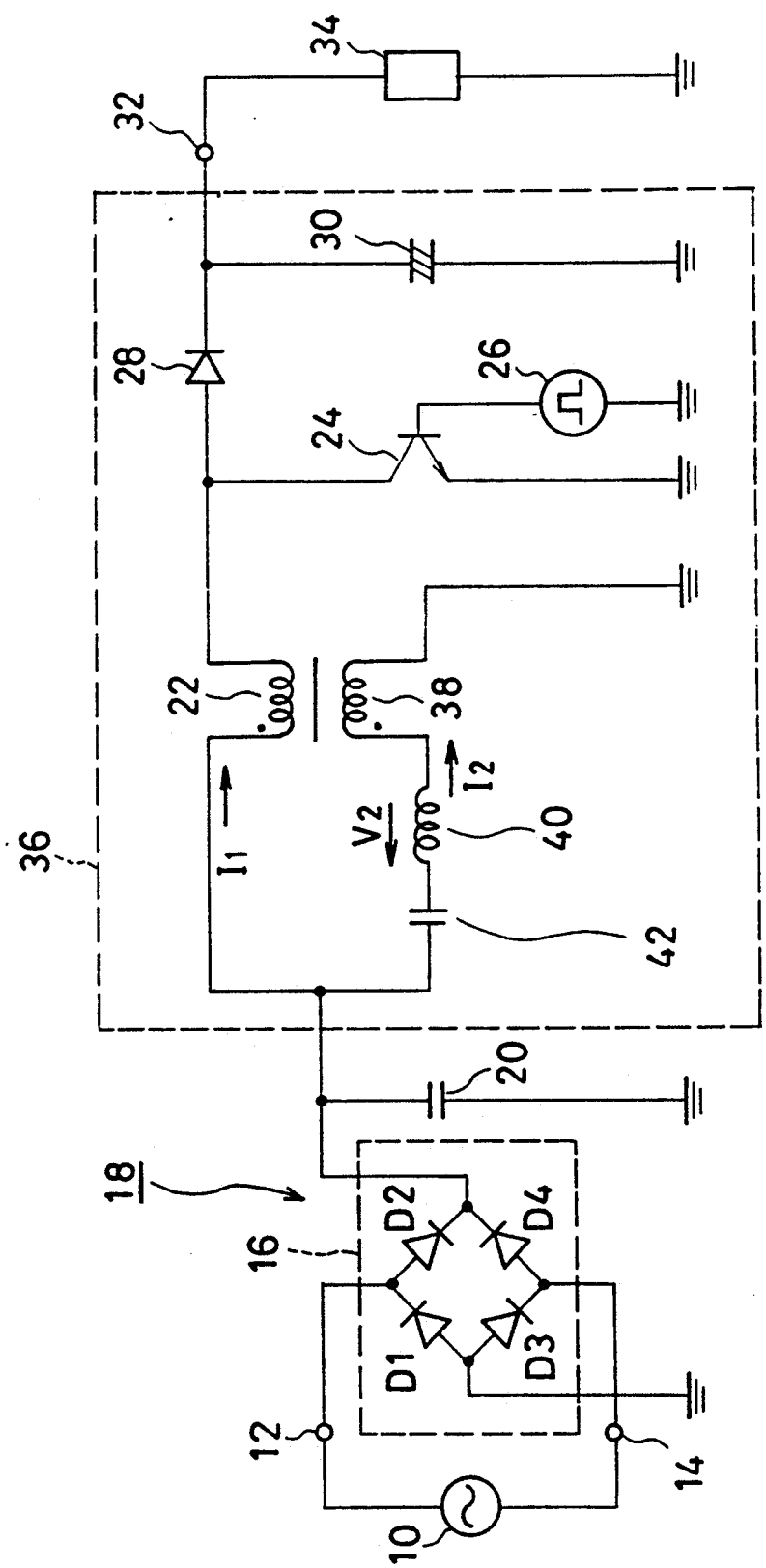
FIG. 2 is a circuit diagram showing an embodiment of the invention.

In FIG. 2, the commercially available AC power source 10 is connected to the input terminals 12 and 14 of the rectifying and smoothing circuit 18. The rectifying circuit 16 constructs a diode bridge by four diodes $D_1$ to $D_4$ and rectifies an AC voltage which is supplied. The voltage rectified by the rectifying circuit 16 is smoothed by the capacitor 20 and is transferred to the chopper circuit 36.

The chopper circuit 36 has the choke coil 22 and the transistor 24 serving as a switching device. The transistor 24 is turned on/off by the switching operation by high frequency pulses which are generated from the oscillator 26, thereby intermittently inducing an energy in the choke coil 22. The intermittent energy induced in the choke coil 22 is rectified by the diode 28 and is smoothed by the capacitor 30 and is supplied to the load 34 through the output terminal 32 as a step-up DC voltage.

Another winding 38 is provided for the choke coil 22 and is magnetically coupled therewith so as to have the same polarity as that of the choke coil 22.

One end of another winding 38 is connected to the ground and the other end is connected to the input side of the choke coil 22 through a serial circuit which is constructed by an inductance 40 for adjusting a current and a capacitor 42 for cutting out a DC component.

The current adjusting inductance 40 is inserted serially with another winding 38 in order to adjust an amount of current flowing in another winding 38.

In association with the switching operation of the transistor 24, a magnetic coupling is caused by the intermittent energy which is applied to the choke coil 22, so that a current of a phase opposite to that of the current flowing in the choke coil 22 flows in another winding 38. A change amount of the current flowing in another winding 38 is fed back to the input smoothing capacitor 20 and is synthesized to the ripple current flowing in the choke coil 22, thereby setting off the high frequency ripple voltage which is generated in the capacitor 20.

The operation will now be described.

The AC voltage which is supplied from the commercially available AC power source 10 is rectified by the rectifying circuit 16 and is smoothed by the capacitor 20 and, after that, it is supplied to the chopper circuit 36.

Figure 3:
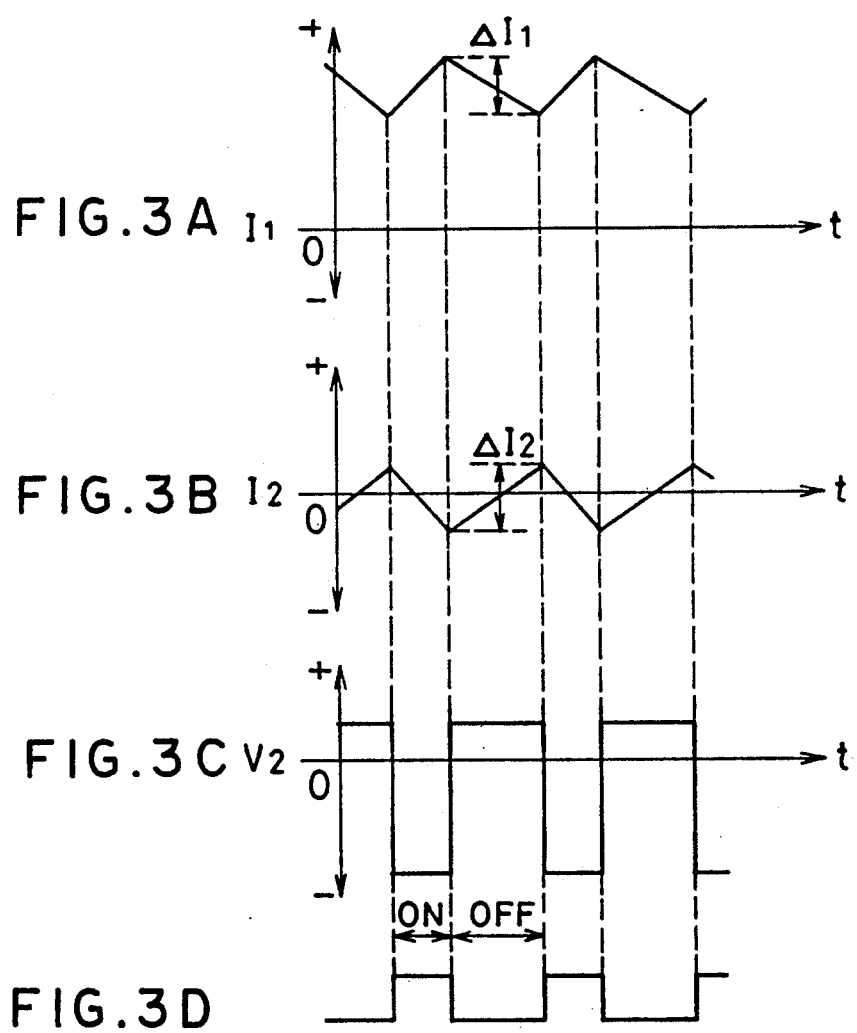
FIGS. 3A, 3B, 3C, and 3D are explanatory diagrams showing signal waveforms in FIG. 2.

FIG. 3A shows a current $I_1$ flowing in the choke coil 22. FIG. 3B shown a current $I_2$ flowing in another winding 38. FIG. 3C shows a voltage $V_2$ across the inductance 40 for adjusting the current. Further, FIG. 3D shows on/off states of the transistor 24.

$\Delta I_1$ in FIG. 3A denotes a change amount of the current $I_1$. $\Delta I_2$ in FIG. 3B shows a change amount of the current $I_2$.

In the on-state of the transistor 24, a predetermined voltage is applied across the choke coil 22 and the current $I_1$ linearly increases. At the same time, a predetermined voltage which is turn-ratio times as high as the voltage applied to the choke coil 22 is induced across another winding 38. At this time, if a capacitance of the capacitor 42 for cutting out the DC component is sufficiently large, the predetermined voltage induced in another winding 38 is directly applied to the current adjusting inductance 40 and the current $I_2$ linearly decreases.

When the transistor 24 is subsequently turned off, a reverse predetermined voltage is applied across the choke coil 22 and the current $I_1$ linearly decreases. At this time, a voltage which is turn-ratio times as high as the reverse predetermined voltage applied to the choke coil 22 is induced across another winding 38 and is directly applied to the current adjusting inductance 40. The current $I_2$ linearly increases.

Since a value of the current adjusting inductance 40 is set so that the change amount $\Delta I_1$ of $I_1$ and the change amount $\Delta I_2$ of $I_2$ are equal, the ripple current flowing in the input smoothing capacitor 20 can be set off.

Therefore, it is possible to prevent that the high frequency ripple voltage is generated in the input smoothing capacitor 20. An amount of high frequency noise which is multiplexed between the input terminals 12 and 14 can be reduced.

It is sufficient to set a capacitance of the input smoothing capacitor 20 to a small value enough to obtain a fluctuation amount of the high frequency ripple voltage. It is not always necessary to set such a capacitance to a value enough to smooth a pulsating current included in the output of the rectifying circuit 16.

Figure 4:
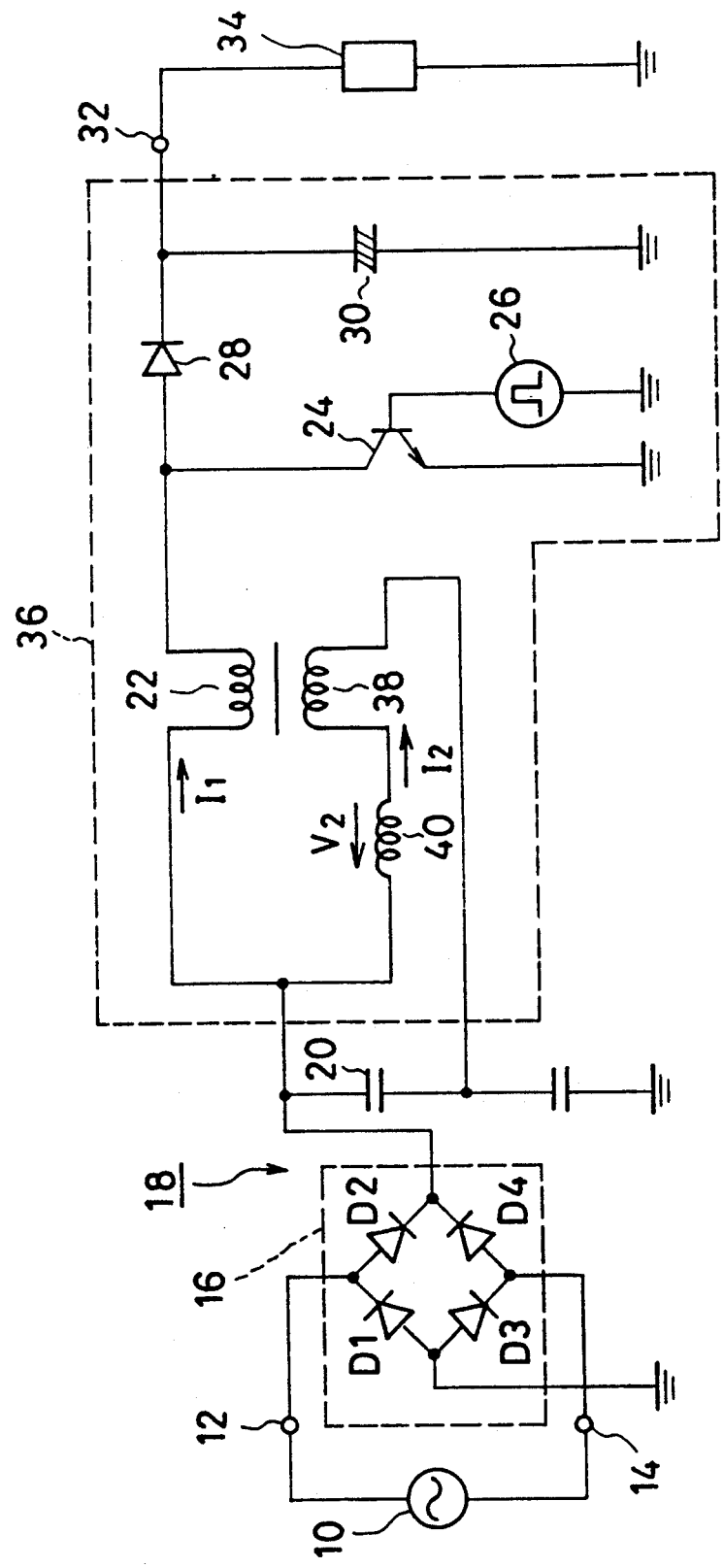
FIG. 4 is a circuit diagram showing another embodiment of the invention.

FIG. 4 shows another embodiment of the invention.

In FIG. 4, the capacitor 20 and a capacitor 44 are serially connected and are used as an input smoothing capacitor. In a manner similar to FIG. 2, another winding 38 is magnetically coupled to the choke coil 22 in the step-up chopper circuit 36 so as to have the same polarity. One end of another winding 38 is connected to the input side of the choke coil 22 through the current adjusting inductance 40. The other end of another winding 38 is connected to an intermediate point between the input adjusting capacitors 20 and 44 which are serially connected.

The value of the current adjusting inductance 40 is set so that magnitudes of the ripple voltage of the input smoothing capacitor 22 and the ripple voltage of the capacitor 44 are equal at opposite phases.

Thus, the high frequency ripple voltage which is generated in the input smoothing capacitors 20 and 44 can be set off and an amount of high frequency noise which is multiplexed between the input terminals 12 and 14 can be reduced.

What is claimed is:

1. A step-up power supplying circuit for rectifying an AC voltage and, thereafter, for stepping up and generating a step-up voltage, comprising:
   rectifying means for rectifying the AC voltage;
   smoothing means for smoothing a rectified output of said rectifying means;
   chopper means for transferring a DC voltage which is generated from said smoothing means to a choke coil, for rectifying and smoothing an intermittent energy which is generated by on/off driving operations of said choke coil by switching means, and thereby for generating a step-up DC voltage;
   another winding which is magnetically coupled to said choke coil so as to have a same polarity and whose one end is connected to a ground and whose the other end is connected to an input side of the choke coil; and
   an inductance which is connected serially with said another winding and adjusts a current flowing in said another winding.

2. A circuit according to claim 1, wherein a capacitor for cutting out a DC component is provided serially with said inductance.

3. A circuit according to claim 1, wherein said inductance adjusts in a manner such that a change in current flowing in said another winding is equalized to a change in current flowing in said choke coil.

4. A step-up power supplying circuit for rectifying an AC voltage and, thereafter, for stepping up and generating a step-up voltage, comprising:

rectifying means for rectifying the AC voltage;

smoothing means which is constructed by serially connecting first and second capacitors for smoothing a rectified output of said rectifying means;

chopper means for transferring a DC voltage which is generated from said smoothing means to a choke coil, for rectifying and smoothing an intermittent energy which is generated by on/off driving operations of said choke coil by switching means, and thereby for generating a step-up DC voltage;

another winding which is magnetically coupled to the choke coil so as to have a same polarity and whose one end is connected between said first and second capacitors and whose the other end is connected to an input side of the choke coil; and an inductance which is connected serially with said another winding and adjusts a current flowing in said another winding.

5. A circuit according to claim 4, wherein said inductance adjusts in a manner such that a change in current flowing in said another winding is equalized to a change in current flowing in said choke coil.

* * * * *